(12) United States Patent
Farreyrol

(10) Patent No.: US 12,091,729 B2
(45) Date of Patent: Sep. 17, 2024

(54) METHOD OF PRODUCING A VEHICLE GLASS ASSEMBLY

(71) Applicant: ACR II GLASS AMERICA INC., Nashville, TN (US)

(72) Inventor: Olivier Farreyrol, Machtum (LU)

(73) Assignee: ACR II GLASS AMERICA INC., Nashville, TN (US)

( * ) Notice: Subject to any disclaimer, the term of this patent is extended or adjusted under 35 U.S.C. 154(b) by 1035 days.

(21) Appl. No.: 16/981,766

(22) PCT Filed: Feb. 27, 2019

(86) PCT No.: PCT/JP2019/007426
§ 371 (c)(1),
(2) Date: Sep. 17, 2020

(87) PCT Pub. No.: WO2019/181394
PCT Pub. Date: Sep. 26, 2019

(65) Prior Publication Data
US 2021/0001432 A1 Jan. 7, 2021

(30) Foreign Application Priority Data
Mar. 22, 2018 (GB) ..................................... 1804624

(51) Int. Cl.
*B23K 1/00* (2006.01)
*B22F 1/06* (2022.01)
(Continued)

(52) U.S. Cl.
CPC .............. *C22C 13/00* (2013.01); *B22F 1/06* (2022.01); *B23K 1/00* (2013.01); *B23K 1/0008* (2013.01);
(Continued)

(58) Field of Classification Search
CPC .......... C22C 13/00; C22C 1/0466; B22F 1/06; B22F 7/062; B22F 7/08; B22F 2999/00;
(Continued)

(56) References Cited

U.S. PATENT DOCUMENTS

| 7,514,654 B2 | 4/2009 | Okajima et al. |
| 8,816,214 B2 | 8/2014 | Ziegler et al. |

(Continued)

FOREIGN PATENT DOCUMENTS

| CN | 102972092 A | 3/2013 | |
| CN | 203936494 U | * 11/2014 | ............... B23K 1/00 |

(Continued)

OTHER PUBLICATIONS

Espacenet translation of CN-102972092A (no date available).*

(Continued)

*Primary Examiner* — Kiley S Stoner
(74) *Attorney, Agent, or Firm* — K&L Gates LLP

(57) ABSTRACT

A method of producing a vehicle glass assembly, includes (A) providing a connector made of metal plate and comprising a first flat portion, a second flat portion and a bridge portion connecting between the first and the second flat portions, each the flat portion having a respective surface to be soldered, (B) soldering lead-free solder onto the surfaces to form first and second blocks of lead-free solder on the surfaces of the first flat portion and the second flat portion, respectively, (C) providing a glass substrate layer on which an electrically conductive layer comprising a wire pattern and a busbar is formed, and (D) sandwiching the lead-free solder blocks between their respective surfaces and the busbar, and then melting the blocks to form solder connections between the connector and the busbar; wherein the amount of lead-free solder in each of the blocks is between 15 mg and 50 mg.

20 Claims, 3 Drawing Sheets

(51) Int. Cl.

| | | |
|---|---|---|
| *B23K 3/02* | (2006.01) | |
| *B23K 35/26* | (2006.01) | |
| *B23K 35/30* | (2006.01) | |
| *C03C 27/04* | (2006.01) | |
| *C22C 13/00* | (2006.01) | |
| *H01Q 1/12* | (2006.01) | |
| *H01R 4/02* | (2006.01) | |
| *H01R 43/02* | (2006.01) | |
| *H05B 3/84* | (2006.01) | |
| *B23K 101/00* | (2006.01) | |
| *B23K 103/00* | (2006.01) | |

(52) U.S. Cl.
CPC .............. *B23K 1/0016* (2013.01); *B23K 3/02* (2013.01); *B23K 35/262* (2013.01); *B23K 35/3006* (2013.01); *B23K 35/302* (2013.01); *C03C 27/04* (2013.01); *H01Q 1/1278* (2013.01); *H01R 4/024* (2013.01); *H01R 43/02* (2013.01); *H05B 3/84* (2013.01); *B23K 1/0004* (2013.01); *B23K 2101/006* (2018.08); *B23K 2103/54* (2018.08); *H01R 2201/02* (2013.01); *H05B 2203/01* (2013.01)

(58) Field of Classification Search
CPC .... B23K 3/02; B23K 35/262; B23K 35/3006; B23K 35/302; B23K 1/0004; B23K 2101/006; B23K 2103/54; B23K 35/025; B23K 1/00–206; C03C 27/04; H01Q 1/1278; H01R 4/024; H01R 43/02; H01R 2201/02; H05B 3/84; H05B 2203/01
USPC .......................... 228/179.1–180.22, 245–255
See application file for complete search history.

(56) References Cited

U.S. PATENT DOCUMENTS

| | | | | |
|---|---|---|---|---|
| 11,490,465 | B2* | 11/2022 | Sitterlet | .................... H05B 3/84 |
| 2003/0042239 | A1* | 3/2003 | Sol | .................... B32B 17/10036 |
| | | | | 52/171.2 |
| 2004/0214016 | A1* | 10/2004 | Adachi | ...................... C03C 8/04 |
| | | | | 428/209 |
| 2005/0112291 | A1 | 5/2005 | Okajima et al. | |
| 2006/0228953 | A1* | 10/2006 | Pereira | ...................... H01R 4/02 |
| | | | | 439/876 |
| 2010/0203770 | A1* | 8/2010 | Hirai | .................... H01Q 1/1278 |
| | | | | 439/700 |
| 2013/0043066 | A1 | 2/2013 | Cholewa et al. | |
| 2014/0008347 | A1 | 1/2014 | Sagawa et al. | |

FOREIGN PATENT DOCUMENTS

| | | | | |
|---|---|---|---|---|
| CN | 108621754 A | * | 10/2018 | ............. B32B 15/02 |
| EP | 488878 A1 | * | 6/1992 | ............... H05B 3/84 |
| EP | 0711097 A2 | * | 5/1996 | |
| EP | 2913889 A1 | * | 9/2015 | ........... H01Q 1/1278 |
| EP | 3089272 A1 | * | 11/2016 | ........... H01Q 1/1271 |
| EP | 3240360 A1 | | 11/2017 | |
| GB | 2153162 A | * | 8/1985 | ............. H01R 11/01 |
| JP | 2004189023 A | * | 7/2004 | ............... H05B 3/84 |
| JP | 2004327356 A | * | 11/2004 | ............. C03C 17/06 |
| JP | WO2003076239 A1 | * | 7/2005 | |
| JP | 2013-532116 A | | 8/2013 | |
| JP | 2014-096198 A | | 5/2014 | |
| JP | 2014-520355 A | | 8/2014 | |
| JP | 2016-503568 A | | 2/2016 | |
| JP | 2006523917 A | * | 10/2016 | |
| KR | 20170094860 A | * | 8/2017 | |
| WO | 03/076239 A1 | | 9/2003 | |
| WO | 2007/110610 A1 | | 10/2007 | |
| WO | WO-2007110612 A1 | * | 10/2007 | ........... B23K 35/262 |
| WO | WO-2012118203 A1 | * | 9/2012 | ........... B23K 1/0008 |
| WO | WO-2016204247 A1 | * | 12/2016 | ................ B60S 1/02 |
| WO | WO-2017014248 A1 | * | 1/2017 | ................ B60S 1/02 |
| WO | WO-2019092947 A1 | * | 5/2019 | ............... B23K 1/00 |
| WO | WO-2019181395 A1 | * | 9/2019 | ................ B22F 7/08 |
| WO | WO-2019235266 A1 | * | 12/2019 | ............. B60J 1/002 |

OTHER PUBLICATIONS

International Search Report and the Written Opinion for International application No. PCT/JP2019/007426, filed Feb. 27, 2019, mailed on May 13, 2019 by European Patent Office, 15 pages.
Siewert, et al., "Database for Solder Properties with Emphasis on New Lead-free Solders", Properties of Lead-free Solders, Release 4.0, National Institute of Standards and Technology & Colorado School of Mines, Feb. 11, 2002, pp. 1-77. URL: http://www.msed.nist.gov/solder/NIST_LeadfreeSolder_v4.pdf.
English translation of First office action of Chinese patent application No. 201980021625.7 with English translation, issued on Jun. 30, 2021, 11 pages.
Japanese Notice of Reasons for Refusal from corresponding Japanese Patent Application No. 2020-548837, dated Jan. 31, 2023.
European Examination Report from corresponding European Patent Application No. 19712052.0, mailed Jan. 3, 2024. 9 pages.

* cited by examiner

[Fig. 1]
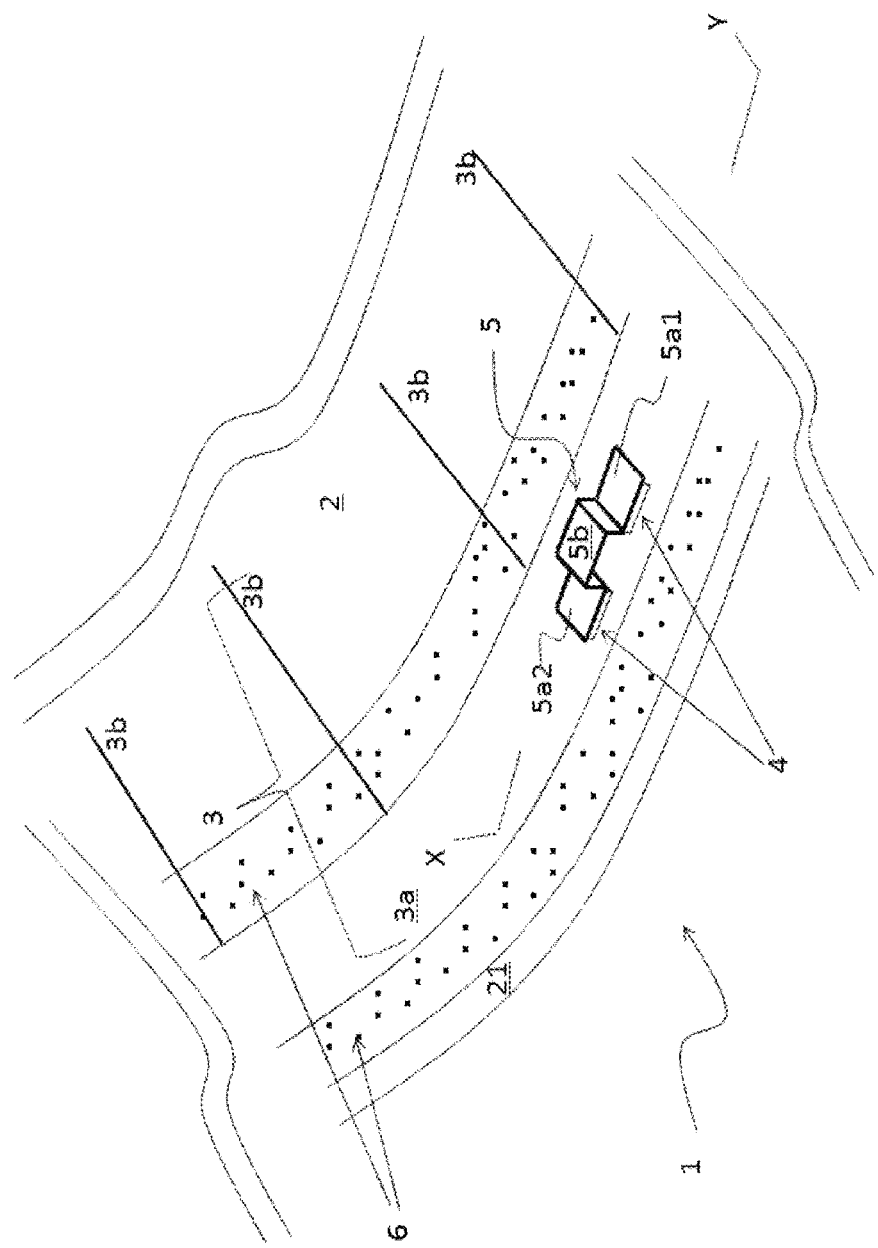

[Fig. 2]
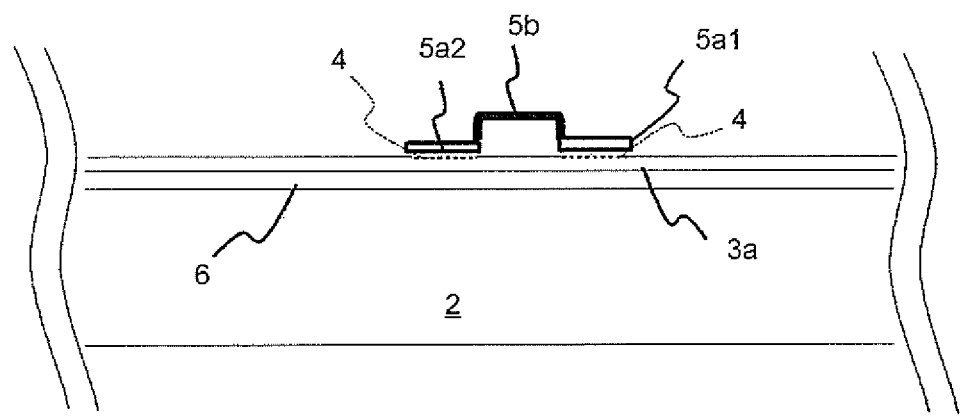
[Fig. 3]
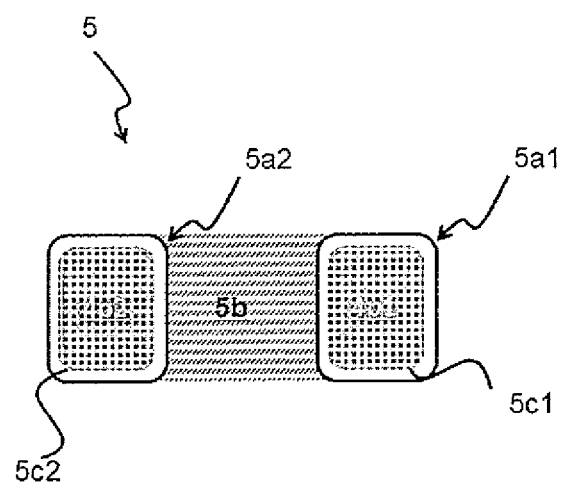

[Fig. 4]
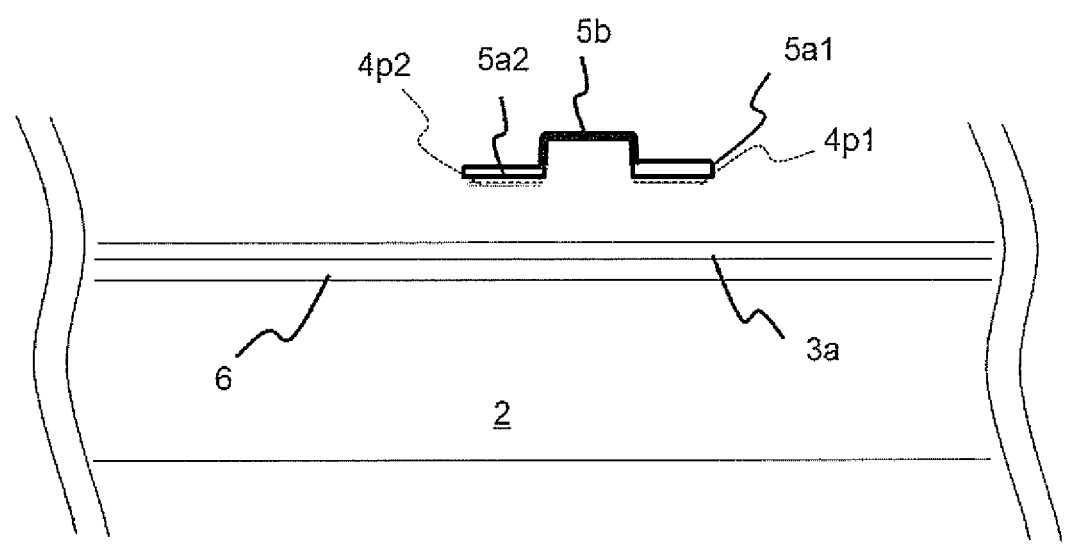

METHOD OF PRODUCING A VEHICLE GLASS ASSEMBLY

CROSS REFERENCE TO RELATED APPLICATIONS

This application is a national stage of PCT International Application No. PCT/JP2019/007426, filed Feb. 27, 2019, and claims priority to GB Patent Application No. 1804624.3 filed Mar. 22, 2018, entitled "Method Of Producing A Vehicle Glass Assembly," the contents of both are incorporated by reference herein in their entireties.

TECHNICAL FIELD

This invention relates to the manufacture of vehicle glass assemblies comprising a glass substrate layer, an electrically conductive layer over the glass substrate layer and an electrical connector connected to the conductive layer by lead-free solder.

BACKGROUND ART

A known vehicle window glass assembly comprises a glass substrate layer, an electrically conductive layer over the window glass substrate layer, and an electrical connector having two flat portions to be soldered to the electrically conductive layer and a bridge portion connecting the flat portions. This type of electrical connector is called a "bridge connector". While bridge connectors have previously been connected to the conductive layer by soldering the connector to the conductive layer with a lead-containing solder, the End of Life Vehicles Directive 2000/53/EC urges the use of lead-free solders instead.

The use of lead-free solders has led to difficulties in compensating mechanical stresses between the glass substrate layer and the bridge connector, resulting in the occurrence of cracks in the vehicle glass assembly. The mechanical stress may be affected by a junction structure consisting of the solder, the conductive layer and the bridge connector. In order to solve the problem, U.S. Pat. No. 8,816,214 discloses a window glass comprising a glass substrate and a bridge connector made of a metal having a thermal expansion coefficient near to that of the glass substrate. WO2007/110610 suggests that a thinner bridge connector, preferably of 0.1 mm to 0.5 mm thickness, can reduce the mechanical stress.

SUMMARY OF INVENTION

Technical Problem

The window glass disclosed in U.S. Pat. No. 8,816,214 is still found to be insufficient in respect of crack occurrences in the glass substrate layer. Thus, further improvement is required. While WO2007/110610 suggests that using an electrical connector of 0.1 mm to 0.5 mm thickness can reduce the mechanical stress, we found that such very thin electrical connectors are liable to the formation of hot spots in the connector during the soldering process using electric resistance heating of the connector. The generation of hot spots may result in residual stresses in the glass substrate layer, which cause cracks in the glass substrate layer.

Solution to Problem

It is an aim herein to provide a new method of making vehicle glass assemblies comprising an electrically conductive layer over a glass substrate layer, and an electrical connector soldered on the conductive layer by lead-free solder.

According to one aspect of the present invention, there is provided a method of producing a vehicle glass assembly, comprising the following steps:
a step (A) of providing a connector made of metal plate and comprising:
  a first flat portion having a first surface to be soldered,
  a second flat portion having a second surface to be soldered, and
  a bridge portion connecting between the first and second flat portions;
a step (B) of soldering lead-free solder onto the first and second surfaces to form a first block of lead-free solder on the first surface and a second block of lead-free solder on the second surface;
a step (C) of providing a glass substrate layer over which an electrically conductive layer, comprising a wire pattern and a busbar, is formed, and
a step (D) of sandwiching said blocks between each of the first and second surfaces of the connector and the busbar and then melting the blocks to form solder connections between the connector and the busbar;
wherein the amount of each block is between 15 mg and 50 mg,
wherein each block on the first and second surfaces is away from all edges of the first and the second flat portions,
wherein all lead-free solders are disposed between the first and the second portions and the busbar in the solder connections.

Advantageous Effects of Invention

We find that when producing vehicle glass assemblies using the above method, mechanical stress between the glass substrate layer and the electrical connector can be relaxed or reduced, and crack occurrence in the glass substrate layer can be decreased.

BRIEF DESCRIPTION OF DRAWINGS

FIG. 1 is a schematic view showing the main components of a vehicle glass assembly as made by the present method;

FIG. 2 is a cross-sectional view of FIG. 1 at X-Y;

FIG. 3 is a schematic view showing a bridge connector in the state after steps (A) and (B), and FIG. 4 is a cross-sectional view showing the bridge connector and glass substrate layer in the state before step (D), the cross-sectional view being taken at the cross-section line X-Y shown in FIG. 1.

DESCRIPTION OF EMBODIMENTS

In the following description, for purposes of explanation and not limitation, specific details are set forth in order to provide an understanding of certain embodiments of the present invention. However, it will be apparent to those skilled in the art that the present invention may be practised in other embodiments that depart from these specific details. In other instances, detailed descriptions of well-known devices, processes, techniques, and methods are omitted so as not to obscure the description with unnecessary detail. We refer now more particularly to the accompanying drawings, in which like reference numerals indicate like parts/elements throughout the several views.

For better understanding of the present invention, the present invention is described using figures. FIG. 1 shows a schematic view of a vehicle glass assembly through the present invention. FIG. 2 shows the X-Y cross-section of FIG. 1. In accordance with typical embodiments of the present invention, a vehicle glass assembly 1 comprises a glass substrate layer 2, an optional coloured ceramic band 6 sintered on a peripheral portion of the glass substrate layer 2, an electrically conductive layer 3 which comprises a busbar 3a and an electrically conductive wire pattern 3b, sintered on the glass substrate 2 and/or on the coloured ceramic band 6, a lead-free solder layer 4 on the conductive layer 3, and a bridge connector 5 which comprises first and second flat portions 5a1,5a2 and a bridge portion 5b connecting the flat portions 5a1, 5a2. Each of these portions is made of metal plate. The flat portions 5a1,5a2 have respective first and second surfaces 5c1,5c2. The first and second surfaces 5c1,5c2 are soldered in step (B) of the method. A solder connection is formed between the bridge connector 5 and the electrically conductive layer 3 via the lead-free solder layer 4. FIG. 3 and FIG. 4 relate to steps (A), (B), (C) and (D) of the method, and details are described below.

The vehicle glass assembly 1 is produced by a production method comprising:

(A) providing the connector 5 made of metal plate and comprising the first flat portion 5a1 providing a first surface 5c1, the second flat portion 5a2 providing a second surface 5c2, and the bridge portion 5b connecting between the first and second flat portions 5a1,5a2;

(B) soldering lead-free solder onto the first and the second surfaces 5c1,5c2 to form a first block 4p1 of lead-free solder on the first surface 5c1 and a second block 4p2 of lead-free solder on the second surface 5c2, (C) providing a glass substrate layer 2 over which the electrically conductive layer 3, comprising the wire pattern 3b and the busbar 3a, is formed, and (D) sandwiching the respective blocks 4p1,4p2 between the first and second surfaces 5c1,5c2 and the busbar 3a, and then melting the blocks 4p1,4p2 to form solder connections between the connector 5 and the busbar 3a;

wherein the amount of each block is between 15 mg and 50 mg.

wherein each block 4p1, 4p2 on the first and second surfaces 5c1,5c2 is away from all edges of the first and the second flat portions 5a1,5a2, wherein all lead-free solders are disposed between the first and the second portions 5a1,5a2 and the busbar 3a in the solder connections.

If the block amounts are smaller than 15 mg, the solder connection may become weak. On the other hand, if the block amounts are larger than 50 mg, the compensation of mechanical stresses between the glass substrate layer 2 and the bridge connector 5 may be too small, resulting in the occurrence of cracks in the glass substrate layer 2, the conductive layer 3, and/or the coloured ceramic band 6. In the light of these factors, the amount may preferably be between 15 and 45 mg, more preferably between 20 and 45 mg. The amount may be less than 45 mg, e.g. 44 mg or less.

In the solder connections, if the lead-free solder is spilled out from a space between the flat portions 5a1,5a2 and the busbar 3a, such structure may provide a mechanical stress between the glass substrate layer and the electrical connector. Therefore, not only the block amount but also soldering position at the step (B) is important. Thus, at the step (B), each block 4p1, 4ps is soldered onto the first and second surfaces 5c1,5c2 so as to be away from all edges of the first and the second flat portions 5a1,5a2. Through the steps, the vehicle glass assembly 1 comes to comprise solder connections in which all lead-free solders are disposed between the first and the second portions 5a1,5a2 and the busbar 3a. Further, the vehicle glass assembly 1 may comprise solder connections in which all lead-free solders recess from all edges of the first and the second flat portions 5a1,5a2, in order that the lead-free solder is certainly not spilled out from the space.

FIG. 3 is a schematic view showing a main section of the bridge connector 5 after steps (A) and (B). The blocks 4p1,4p2 made of lead-free solder are soldered on the first and second flat portions 5a1,5a2 of the bridge connector 5. The flat portions 5a1,5a2 are made of metal plate, in particular the entirety of the bridge connector 5 may be made of one piece of metal plate. The bridge connector 5 can be connected to apparatus such as an amplifier, a power source, audio equipment, radio equipment, a television, a navigation system, etc. via a metal wire and this may be in a known manner.

The area of each of the first and the second surfaces 5c1,5c2 may be between 10 $mm^2$ and 28 $mm^2$. In the case that the area is smaller than 10 $mm^2$, the solder connection may become weak. On the other hand, if the area is larger than 28 $mm^2$, the more the mechanical stress which tends to be transferred to the glass substrate layer 2 due to the brittleness of the lead-free solder and the differential thermal expansion coefficients among the glass substrate layer 2, the lead-free solder layer 4 and the connector 3a. In the light of these factors, the area of each of the first and the second surfaces may more preferably be between 10 and 26 $mm^2$, especially between 13 and 26 $mm^2$.

The thickness of the metal plate may also affect the process of melting the block 4p1,4p2 in step (C). The thicker the metal plate, the more heating energy is required when the melting process is carried out and this may lead to more mechanical stress in the solder connection. On the other hand, the less thick the metal plate, the more difficult the connector 3a is for handling or manufacture. In the light of these factors, the thickness of the metal plate may preferably be between 0.5 mm and 0.8 mm, more preferably between 0.55 mm and 0.7 mm, still more preferably between 0.55 mm and 0.65 mm.

The shape of the first and second flat portions 5a1,5a2 may be a rectangle, a square, oval or circle etc. As an example of the material of the metal plate, there can be mentioned Cu or Cu alloy, Fe alloy comprising Ni or Cr such as INVAR 48 (FeNi48, consisting of 48% nickel in iron alloy). Among these materials, Fe alloy is preferable and INVAR 48 is the most preferable. The distance between the first and second flat portions 5a1,5a2 may preferably be between 4 mm and 15 mm. The clearance between the bridge portion 5b and the conductive layer 3 beneath may typically be between 0.4 mm and 1.5 mm.

In step (B), the lead-free solder is soldered on the first and second surfaces 5c1,5c2 to form the blocks 4p1, 4p2. The volume of each block 4p1,4p2 may desirably be between 2 $mm^3$ and 12 $mm^3$. In the case that the volume is smaller than 2 $mm^3$, the solder connection may sometimes become weak. On the other hand, in the case that the volume is larger than 12 $mm^3$, the compensation of mechanical stresses between the glass substrate 2 and the bridge connector 5 may sometimes be too small, resulting in the occurrence of cracks in the glass substrate layer 2, the conductive layer 3, and/or the coloured ceramic band 6. In the light of these factors, the volume of each block may typically be between 2 $mm^3$ and 10 mm³, preferably between 2 mm³ and 8 mm³, more preferably between 3 mm³ and 8 mm³.

The thickness of each block 4p1,4p2 may also affect the quality of the lead-free solder layer 4. If there is a limited amount of the lead-free solder, an inappropriate thickness of the block 4p1,4p2 may result in an inhomogeneous layer 4 with porosity, which may cause mechanical stress in the glass substrate layer 2. Considering these factors, the thickness may typically be between 0.3 mm and (15 mm, preferably between 0.35 mm and 0.45 mm.

The lead-free solder contains tin as a major component. As examples of lead-free solder, there can be mentioned Sn—Ag based solder, Sn—Ag—Cu based solder and the like. The content of Sn may be e.g. 95 mass % to 99 mass %, preferably 96 mass % to 98 mass %. The content of Ag may be e.g. 1 mass % to 5 mass %, preferably 2 mass % to 4 mass %. The content of Cu may be e.g. 0 mass % to 1.5 mass %, preferably 0.1 mass % to 1 mass %.

FIG. 4 is a cross-sectional view showing the bridge connector and the glass substrate layer before step (D); the cross-sectional view is at line X-Y of FIG. 1. By means of step (C) the glass substrate layer 2 comprising the conductive layer 3 is provided. The glass substrate optionally comprises the colored ceramic band 6 between the glass substrate layer 2 and the conductive layer 3. The glass substrate layer 2 preferably has a curved shape, obtainable e.g. by a known process of bending a flat glass sheet. The glass substrate layer 2 may be e.g. a thermally tempered glass, a chemically tempered glass or a laminated glass. As a material of the glass substrate layer 2, a soda-lime silicate glass as defined by ISO16293-1 can desirably be used. The soda-lime silicate glass may comprise a colorant such as iron oxide and cobalt oxide, so as to present a color such as pale green, dark green, pale gray, dark gray, pale blue or dark blue.

The coloured ceramic band 6 is of a coloured ceramic composition preferably comprising an inorganic heat-resisting pigment and a glass frit that has a lower softening temperature than the material of glass substrate layer 2. Such a peripheral band is well-known, and is sometimes called a frit layer, ceramic band or paint band. The coloured ceramic band 6 is used to overlie an adhesion area between the vehicle glass assembly 1 and a body flange of a vehicle. It can improve weather resistance of the adhesion area and/or make it invisible by covering it, so that black is preferable as the colour of the colored ceramic band layer 6. The thickness of the coloured ceramic band may be e.g. from 5 μm to 25 μm, preferably from 5 μm to 15 μm.

The coloured ceramic band 6 can be obtained for example through the following process. That is, a ceramic paste comprising the inorganic heat-resisting pigment, a glass frit and organic solvent is applied on the peripheral portion of the glass substrate layer 2 by a screen printing method or the like, and then heated to volatilize the organic solvent. Subsequently, the composition comprising the inorganic heat-resisting pigment and glass fit is sintered on the glass substrate layer, thereby forming the coloured ceramic band 6.

Inorganic heat-resisting pigment is mixed in the colour ceramic to give a desired color. The grain diameter of the inorganic heat-resisting pigment may be e.g. 0.1 μm to 10 μm, preferably 0.2 μm to 5 μm, expressed as a D50 value. As the inorganic heat-resisting pigment, known ones can be used. As examples of black pigments, there can be mentioned copper-chromium complex oxide, iron-manganese complex oxide, cobalt-iron-manganese complex oxide, copper-chromium-manganese complex oxide, magnetite and the like.

As examples of blue pigments, there can be mentioned cobalt blue, chromium green, cobalt-zinc-nickel-titanium complex oxide, cobalt-aluminium-chromium complex oxide and the like.

In addition to the above-mentioned, there can be used white pigment (e.g. titanium white, zinc oxide and the like), red pigment (e.g. rouge and the like), yellow pigment (e.g. titanium yellow, titanium-barium-nickel complex oxide, titanium-antimony-nickel complex oxide, titanium-antimony-chromium complex oxide and the like) and other pigments in line with the skilled person's knowledge.

The glass frit is fused by a heating process to form the coloured ceramic band 6. As the glass frit, usual ones may be used. As an example of suitable glass frits, there can be mentioned frits of borosilicate glass, boron-zinc-silicate glass, bismuth-based glass and the like. The softening temperature of the glass frit may be a temperature, for example, 300-600° C., preferably 350-580° C., which is lower than a bending and forming temperature of the glass substrate layer 2. The grain diameter of the glass frit may desirably be 0.1 μm to 10 μm, preferably 0.2 μm to 5 μM, further preferably 1 μm to 4 μm (determined as D50). In the coloured ceramic band 6, the content of the glass material made of the glass frit may typically be from 60 mass % to 80 mass %.

The coloured ceramic band 6 can be also obtained through other methods besides the above-mentioned process. As an example of such other processes, there can be mentioned a digital printing process.

The conductive layer 3, preferably sintered on the glass substrate layer 2 and/or on the coloured ceramic band 6, comprises the electrically conductive wire pattern 3b, that is to say, a pattern of plural spaced wires, and a connecting terminal or busbar 3a for the pattern. The conductive layer 3 is preferably made from silver metal (silver or silver alloy) and a glass frit which may be selected from those exemplified above. The thickness of the electrically conductive layer 3 may be e.g. 3 μm to 20 μm, preferably 5 μm to 15 μm, more preferably 12 μm to 17 μm.

The conductive layer 3 may be obtained e.g. by the following process. That is, a silver paste comprising the silver metal, the glass frit and an organic solvent is applied on the glass substrate layer 2, or onto the coated and dried ceramic colour paste, by a screen printing method or the like, and is then heated to volatilize the organic solvent. Subsequently, the composition comprising the silver metal and the glass frit is sintered on the glass substrate layer 2 or on the coloured ceramic band 6, thereby forming the electrically conductive layer 3. As is well-known, the conductive layer 3 can be used as a printed hot-wire, such as a defogger and/or defroster, or as an antenna.

The grain diameter of the silver metal may be e.g. 0.1 μm to 10 μm, preferably 0.2 μm to 7 μm (determined as D50). In the electrically conductive layer 3, the content of the silver metal may be e.g. 65 mass % to 99 mass %, preferably 75 mass % to 98 mass %.

The conductive layer 3 can be also obtained through other methods besides the above-mentioned processes. As an example of such other processes, there can be mentioned a digital printing process.

By means of step (D) the eventual vehicle glass assembly 1 is obtained. In step (D), each block 4p1,4p2 of solder is sandwiched between the respective flat portion 5a1, 5a2 and the busbar 3a, and then each block 4p1,4p2 is melted and may be pressed therebetween to form a solder connection between the bridge connector 5 and the busbar 3a, forming the lead-free solder layers 4. Through this process, each lead-free solder layer 4 may be thinner than each block 4p1,4p2 in thickness. In a process (reflow process) in which each block 4p1,4p2 is melted, each block 4p1,4p2 may be heated up from a melting temperature of the lead-free solder to 50° C. above the melting temperature. The reflow process may be carried out e.g. by using a soldering iron or by electrical heating of the bridge connector 5. It is preferable that the reflow process is carried out through the electrical heating of the bridge connector 5.

The thickness of each lead-free solder layer 4 is desirably between 0.1 mm and 0.3 mm. In the case that the thickness is more than 0.3 mm, a difference of thermal expansion behavior between the glass substrate layer 2 and the solder layer 4 may cause mechanical stress at an interface of the glass substrate layer 2 or the electrically conductive layer 3 during the reflow process, or during use with the window glass 1 fitted in a vehicle. The mechanical stress may enhance a risk of permanent tensile stress in the glass substrate layer 2, resulting in crack generation in the glass substrate layer 2. On the other hand, in the case that the thickness is less than 0.1 mm, it may enhance a risk of generation of hot spots at the solder layer during the reflow process. The generation of hot spots may result in residual stress in the glass substrate layer 2 which causes cracking in the glass substrate layer 2.

Considering all these factors, the thickness of each of the lead-free solder layers 4 is preferably between 0.15 mm and 0.25 mm.

EXPERIMENTAL

Example 1

A base test specimen was provided. The specimen comprises a thermally tempered glass substrate layer 2 with 3 mm thickness and made of a soda-lime silicate glass defined by ISO16293-1, and a conductive layer 3 comprising an electrically conductive wire pattern 3b and a busbar 3a as shown in FIGS. 1, 2 and 4. This corresponds to step (C) of the method.

A bridge connector 5 comprising first and second flat portions 5a1,5a2 and a bridge portion 5b connecting the flat portions 5a1,5a2 was provided as shown in FIGS. 1-4. The connector 5 was made of Invar 48 (FeNi48 alloy) metal plate of 0.80 mm thickness. The flat portions 5a1,5a2 had a first surface 5c1 and a second surface 5c2, respectively. Each of these surfaces had a square shape and an area of 24 mm². This corresponds to step (A) of the method.

Lead-free solder made of Sn (96.5 mass %)-Ag (3.0 mass %)-Cu (0.5 mass %) was soldered onto the surfaces 5c1,5c2 to form blocks 4p1,4p2 respectively. Each block 4p1, 4ps on the first and second surfaces was away from all edges of the first and the second flat portions 5a1,5a2. In this example, the amount of solder in each block was 33.44 mg, and the volume and thickness of each block 4p1,4p2 were respectively 4.5 mm³ and 0.4 mm. This corresponds to step (B) of the method.

Each of the blocks 4p1,4p2 was placed on the busbar 3a so as to be sandwiched between the respective flat portion 5a1,5a2 and the busbar 3a. The bridge connector 3 was electrically heated so that the blocks 4p1,4p2 melted to form solder connections between the connector 5 and the busbar 3a. This corresponds to step (D) of the method. Through the step (D), the lead-free solder did not spill out a space between the flat portions 5a1,5a2 and the busbar 3a. In this experiment, the soldered specimen was taken as the vehicle glass assembly 1.

The following heat cycle tests were conducted for 10 samples made in accordance with Example 1.
(1) 20 times repeat of alternate cycling from −40° C. to +80° C. over 12 hours.
(2) Holding each sample at −40° C. for 4 hours and at +80° C. for 4 hours, with 80% controlled humidity at positive temperatures and uncontrolled humidity at negative temperatures.

No cracks were observed in the glass substrate layer 2 for any of the 10 samples.

Example 2

The procedure of Example 1 was repeated with the exception that the amount of each lead-free solder block was 44.34 mg, and the volume of each block 4p1,4p2 and the thickness of each block 4p1,4p2 were respectively 6 mm³ and 0.4 mm. No crack in the glass substrate layer 2 was observed for any of the samples in the heat cycle tests.

Example 3

The procedure of Example 1 was repeated with the exception that the amount of each lead-free solder block was 21 mg, and the volume of each block 4p1,4p2 and the thickness of each block 4p1,4p2 were respectively 2.8 mm³ and 0.4 mm. No crack in the glass substrate layer 2 was observed for any of the samples in the heat cycle tests.

Comparative Example 1

The procedure of Example 1 was repeated with the exception that the amount of each lead-free solder block was 62 mg, and the volumes of the blocks 4p1,4p2 and the thicknesses of the blocks 4p1,4p2 were respectively 8.4 mm³ and 0.5 mm. In the heat cycle tests, cracking was observed for 7 out of 10 samples in this comparative example.

Comparative Example 2

The procedure of Example 1 was repeated with the exception that the amount of each lead-free solder block was 14 mg, and the volumes of the blocks 4p1,4p2 and the thicknesses of the blocks 4p1,4p2 were respectively 2 mm³ and 0.1 mm. During the heat cycle tests, in 3 out of 10 samples, destruction of the solder connection was observed.

The invention claimed is:
1. A method of producing a vehicle glass assembly, comprising:
(A) providing a connector made of metal plate and comprising a first flat portion, a second flat portion and a bridge portion connecting between the first and the second flat portions, said flat portions respectively having first and second surfaces for soldering,
(B) soldering lead-free solder onto said surfaces to form first and second blocks of lead-free solder on the first and second surfaces, respectively,
(C) providing a glass substrate layer on which an electrically conductive layer comprising a wire pattern and a busbar is formed, and
(D) sandwiching the lead-free solder blocks between their respective surfaces and the busbar, and then melting the blocks to form lead-free solder layers by solder connections between the connector and the busbar;

wherein the amount of lead-free solder in each of the blocks is between 15 mg and 50 mg, wherein each block on the first and second surfaces is away from and disposed within all edges of the surfaces for soldering of the first and the second flat portions, wherein all lead-free solders are disposed between the first and the second flat portions and the busbar in the solder connections.

2. The production method according to claim 1, wherein the amount of lead-free solder in each of the blocks is from 20 mg to less than 45 mg.

3. The production method according to claim 1, wherein the area of each of said first and second surfaces is between 10 mm² and 28 mm².

4. The production method according to claim 1, wherein the thickness of the metal plate forming the connector is between 0.5 mm and 0.8 mm.

5. The production method claim 1, wherein the volume of each block is between 2 mm³ and 12 mm³.

6. The production method according to claim 1, wherein the thickness of each block is between 0.3 mm and 0.5 mm.

7. The production method according to claim 1, wherein all lead-free solders recesses from all edges of the first and the second flat portions.

8. The production method according to claim 1, wherein the shape of the first and second flat portions is a rectangle, a square, an oval, or a circle.

9. The production method according to claim 1, wherein the metal plate is made of Cu, a Cu alloy, or an Fe alloy comprising Ni or Cr.

10. The production method according to claim 1, wherein the distance between the first and second flat portions is between 4 mm and 15 mm.

11. The production method according to claim 1, wherein the lead-free solder contains tin as a major component.

12. The production method according to claim 1, wherein the lead-free solder is an Sn-Ag based solder or an Sn-Ag-Cu based solder.

13. The production method according to claim 12, wherein the lead-free solder contains 95-99 mass % of Sn, 1-5 mass % of Ag, and 0-1.5 mass % of Cu.

14. The production method according to claim 1, wherein each lead-free solder layer is thinner than each block in thickness.

15. The production method according to claim 1, wherein the blocks are melted in the step (D) by using a soldering iron or by electrical heating of the connector.

16. The production method according to claim 1, wherein each lead-free solder layer has a thickness that is between 0.1 mm to 0.3 mm.

17. A method of producing a vehicle glass assembly, comprising:
(A) providing a connector made of metal plate and comprising a first flat portion, a second flat portion and a bridge portion connecting between the first and the second flat portions, said flat portions respectively having first and second surfaces for soldering,
(B) soldering lead-free solder onto said surfaces to form first and second blocks of lead-free solder on the first and second surfaces, respectively,
(C) providing a glass substrate layer on which an electrically conductive layer comprising a wire pattern and a busbar is formed, and
(D) sandwiching the lead-free solder blocks between their respective surfaces and the busbar, and then melting the blocks to form lead-free solder layers by solder connections between the connector and the busbar;

wherein the amount of lead-free solder in each of the blocks is between 20 mg and less than 45 mg, wherein each block on the first and second surfaces is away from and disposed within all edges of the surfaces for soldering of the first and second flat portions, wherein all lead-free solders are disposed between the first and the second flat portions and the busbar in the solder connections, wherein the area of each of said first and second surfaces is between 10 mm² and 28 mm², wherein the thickness of the metal plate forming the connector is between 0.5 mm and 0.8 mm, wherein the volume of each block is between 2 mm³ and 12 mm³, wherein the thickness of each block is between 0.3 mm and 0.5 mm, wherein all lead-free solders recesses from all edges of the first and the second flat portions.

18. The production method according to claim 17, wherein the lead-free solder is an Sn-Ag based solder or an Sn-Ag-Cu based solder.

19. The production method according to claim 18, wherein the lead-free solder contains 95-99 mass % of Sn, 1-5 mass % of Ag, and 0-1.5 mass % of Cu.

20. The production method according to claim 17, wherein the blocks are melted in the step (D) by using a soldering iron or by electrical heating of the connector.

* * * * *